No. 830,027. PATENTED SEPT. 4, 1906.
W. M. VENABLE.
GARBAGE CREMATORY.
APPLICATION FILED OCT. 14, 1905.

Witnesses.

Inventor.

No. 830,027. PATENTED SEPT. 4, 1906.
W. M. VENABLE.
GARBAGE CREMATORY.
APPLICATION FILED OCT. 14, 1905.

Witnesses. Inventor.

UNITED STATES PATENT OFFICE.

WILLIAM MAYO VENABLE, OF NEW YORK, N. Y.

GARBAGE-CREMATORY.

No. 830,027.

Specification of Letters Patent.

Patented Sept. 4, 1906.

Application filed October 14, 1905. Serial No. 282,706.

*To all whom it may concern:*

Be it known that I, WILLIAM MAYO VENABLE, a citizen of the United States, residing at New York city, county of New York, and State of New York, have invented certain new and useful Improvements in Garbage-Crematories, of which the following is a specification.

My invention relates to improvements in crematories in which garbage or refuse is burned on grates with an updraft either with or without previous drying.

In burning garbage and other refuse there are three distinct processes that must be carried out. One is the evaporation of the water contained in the garbage, the second is the superheating of the vapors distilled out while water is being evaporated, so that they will not cause offensive odors when discharged from the crematory, and the third is the actual combustion of the portion of the garbage that is capable of oxidation with air. In the present state of the art these processes are more or less confused, or when separately considered they are carried on with an unnecessary complication of apparatus.

In general, the object of my improvements is to accomplish the complete burning, without offensive odors, of garbage or refuse of any kind, whether wet or dry, in a single furnace, with the utmost economy in construction. In particular, this involves the four subordinate objects: first, to provide for a variable number of fires where fuel other than garbage may be burned effectively for drying garbage and cremating odors, such number to be used as the condition of the garbage may warrant; second, to secure complete oxidation of the combustible portion of the garbage by burning it, when sufficiently dry, on grates provided with an updraft; third, to secure large capacity of the crematory by providing a large area of grate-surface that may be used for drying refuse, for containing refuse preliminary to burning it, or for actually burning refuse or fuel, as may be most advantageous at any stage in the process, and, fourth, to secure economy in the amount of labor required for stoking the garbage in the crematory.

The accompanying drawings illustrate my invention, in which—

Figure 1:
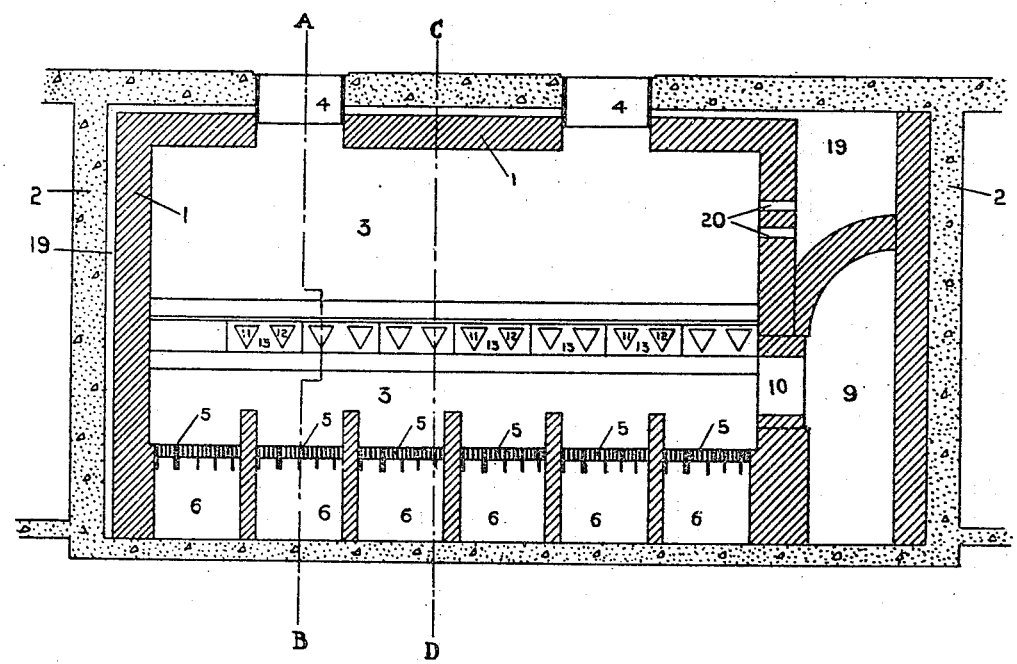
Figure 1 is a longitudinal vertical section through the crematory.

As shown in the figures, 1 is the fire-brick lining of the crematory; 2, a masonry protecting-wall surrounding same; 3, the interior of combustion-chamber; 4, feed-holes for introducing garbage or refuse; 5, grates for burning same; 6, ash-pits below 5; 7, openings communicating with 6; 8, openings for stoking the fires on 5; 9, a second combustion chamber or flue affording communication with the stack or other place for disposing of the gases of combustion, (not shown,) and 10 an opening between 3 and 9. The opening 4 is provided with covers. (Not shown.) The openings 7 and 8 are provided with doors 24 and 25 capable of being closed at will.

Floors for receiving, drying, and stoking the refuse down upon the grates 5 are shown by 11 and 12. These are made up of hollow bars of triangular cross-section, 11 being adapted to be rotated by a tool inserted in its end from the outside of the crematory. 13 and 14 are bearings for the ends of 11, 13 also supporting one end of 12. The other end of 12 rests upon a portion of the lining 1. The parts 11, 12, 13, and 14 are removable without necessitating any change in the lining 1.

15 represents openings for access to 3, above the bars 11 and 12. They are provided with doors 23.

16 and 17 are openings from the exterior of the furnace to the interior of the bars 11 and 12 through the fire-brick lining 1.

18 represents openings from the rear of the bars 11 and 12 into an air-space 19 between the lining 1 and a portion of the protecting-wall 2.

20 represents openings from 19 into the interior of the crematory 3, preferably at the end of same, as shown.

Figure 4:
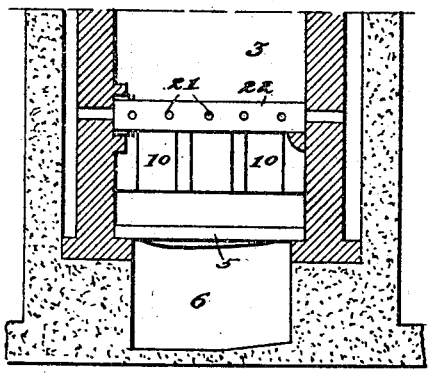
Fig. 4 shows an alternate construction of the bar 12 shown in Fig. 3.
Figure 3:
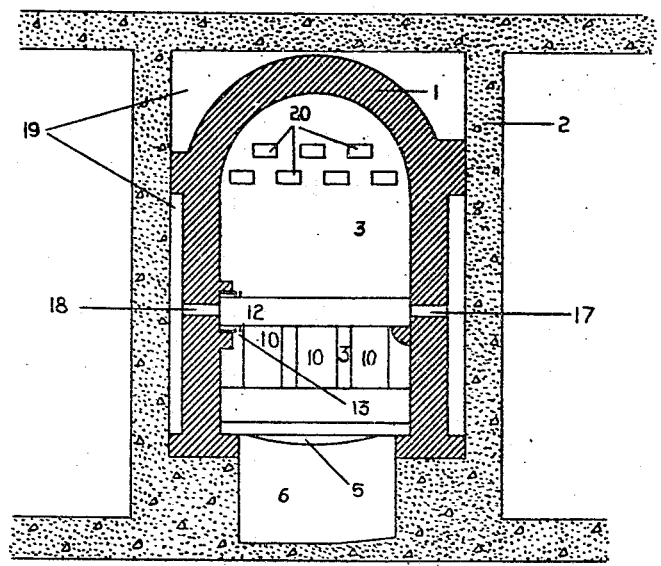
Figure 2:
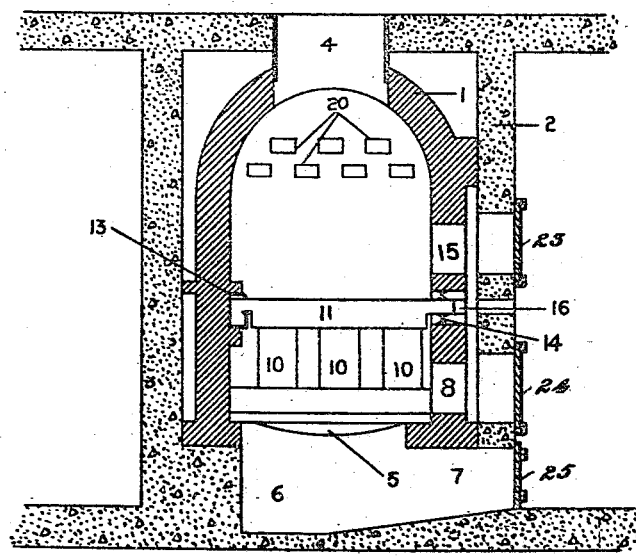
Fig. 2, a transverse section on the line A B of Fig. 1, and Fig. 3 a transverse section on the line C D of Fig. 1.

Instead of the construction shown in Fig. 3 the openings 20 may be omitted and bars 22, with openings 21, as shown in Fig. 4, substituted for the bars 12. (Shown in Fig. 3.) I may also employ an iron jacket to protect the crematory instead of the masonry protecting-wall 2.

The operation of the crematory is as follows: Materials to be cremated are introduced through the openings 4 or 15 and spread upon the floor formed by 11 and 12. Fires are kindled on certain of the grates 5, in case wet garbage is to be burned upon the grates nearest to the passage 10, in order to cremate foul odors on their passage into the secondary combustion-chamber 9, and as many others as may be necessary to produce the heat required to dry the garbage on the bars 11 and 12. As the garbage becomes dry enough it is stoked down upon the grates 5, where desired, and burned with an updraft either on top of fuel-fires or on grates where fuel-fires had not been kindled. Air is admitted to such sections of the grates 5 as may be required by the openings 7 or excluded by closing the doors thereto. In this manner the fires, both of garbage and of fuel, on the grates 5 may be controlled at will. Air circulates through the hollow bars as follows: When the openings 20 are employed, as shown in Fig. 3, air enters at 16 and 17, passes through 11 and 12, the rear bearing 13, the openings 18, into the space 19, thence through the openings 20 into one end of the combustion-chamber 3 above the bars 11 and 12, upon which garbage is placed, over the garbage to the other end of the combustion-chamber, thence under the bars, mingling with the fires on the grates 5, and with them to the point of disposal. When the openings 20 are omitted and the bars 22, with holes 21, are employed, the air enters at 16, passes through the bars 11, the bearings 13, into the bars 22, and through the holes 21 into the combustion-chamber immediately above the grates 5, and thence as previously described. In either case the heat communicated to the air by the bars 10 and 11 is utilized to assist in maintaining a high temperature in the combustion-chamber 3 where it is needed.

For burning certain kinds of wastes the drying-floor and the openings 15 may be omitted, such drying as is necessary being done on the grates 5.

Any suitable disposal may be made of the gases issuing from 9, such as regaining their surplus heat by use of a steam-boiler, if desired. Artificial draft of any kind or natural draft may be employed at discretion.

I am aware that hollow bars have been used in crematories before; but such bars have not been constructed as those I use nor have they combined the several functions for which I use them.

What I claim, and desire to protect by Letters Patent, is as follows:

1. In a crematory an elongated combustion-chamber divided horizontally into an upper portion and a lower portion by a garbage-receiving platform, the entire floor of the combustion-chamber being formed by a number of sections of updraft-grates separated from one another by partition-walls extending to the bottom of each ash-pit beneath, in combination with means for controlling at will the admission of air to each ash-pit.

2. In a crematory, a series of updraft-grates, each provided with a separate ash-pit, to any of which pits and grates air may be admitted or excluded at will; all of said grates surmounted by one combustion-chamber; in combination with a platform mounted horizontally within the combustion-chamber, and adapted to receive the garbage and to stoke it down upon the grates below, as desired.

3. In a crematory, a series of updraft-grates, each grate provided with an ash-pit to which fresh air may be admitted at will, said grates and ash-pits being arranged side by side so as to form the bottom of an elongated combustion-chamber; a combustion-chamber above said grates, in combination with a garbage receiving and stoking platform located therein, adapted to receive the garbage and support it until stoked down upon the grates for final incineration with an updraft.

In testimony whereof I have signed my name to this specification in the presence of two subscribing witnesses.

WM. MAYO VENABLE.

Witnesses:
C. E. BOLMER,
IRA E. BREWER.